United States Patent
Salkintzis

(10) Patent No.: US 10,327,174 B2
(45) Date of Patent: Jun. 18, 2019

(54) OFFLOAD BEARING IN A WIRELESS COMMUNICATION SYSTEM

(71) Applicant: Motorola Mobility LLC, Chicago, IL (US)

(72) Inventor: Apostolis Salkintzis, Athens (GR)

(73) Assignee: Motorola Mobility LLC, Chicago, IL (US)

(*) Notice: Subject to any disclaimer, the term of this patent is extended or adjusted under 35 U.S.C. 154(b) by 104 days.

(21) Appl. No.: 15/342,942

(22) Filed: Nov. 3, 2016

(65) Prior Publication Data

US 2018/0124641 A1 May 3, 2018

(51) Int. Cl.
| | | |
|---|---|---|
| *H04W 28/08* | (2009.01) | |
| *H04W 84/04* | (2009.01) | |
| *H04W 84/12* | (2009.01) | |
| *H04W 88/06* | (2009.01) | |
| *H04L 12/707* | (2013.01) | |

(52) U.S. Cl.
CPC .............. *H04W 28/08* (2013.01); *H04L 45/24* (2013.01); *H04W 84/042* (2013.01); *H04W 84/12* (2013.01); *H04W 88/06* (2013.01)

(58) Field of Classification Search
CPC .... H04W 28/08; H04W 84/042; H04W 84/12
See application file for complete search history.

(56) References Cited

U.S. PATENT DOCUMENTS

2016/0219480 A1* 7/2016 Roeland ............ H04W 28/0268

FOREIGN PATENT DOCUMENTS

| WO | 2014/137169 A1 | 9/2014 |
| WO | 2014/165832 A1 | 10/2014 |

OTHER PUBLICATIONS

PCT/US2016/060911, International Search Report, dated Oct. 2, 2017, pp. 1-3.
PCT/US2016/060911, Written Opinion of the International Searching Authority, dated Oct. 2, 2017, pp. 1-5.

* cited by examiner

*Primary Examiner* — Siming Liu
(74) *Attorney, Agent, or Firm* — Kunzler Bean & Adamson

(57) ABSTRACT

Apparatuses, methods, and systems are disclosed for offload bearing. One apparatus includes a processor that determines whether the apparatus will apply traffic steering rules for routing data traffic on a first route across a first access network and a second route across a second access network. In some embodiments, the first and second routes may be different. In various embodiments, the apparatus includes a transmitter that transmits information that indicates whether the apparatus will apply the traffic steering rules.

18 Claims, 8 Drawing Sheets

OFFLOAD BEARING IN A WIRELESS COMMUNICATION SYSTEM

FIELD

The subject matter disclosed herein relates generally to wireless communications and more particularly relates to offload bearing in a wireless communication system.

BACKGROUND

The following abbreviations are herewith defined, at least some of which are referred to within the following description.
  3GPP Third Generation Partnership Project
  ACK Positive-Acknowledgment
  ANDSF Access Network Discovery and Selection Function
  AP Access Point
  APN Access Point Name
  AS Access Stratum
  BLER Block Error Ratio
  BPSK Binary Phase Shift Keying
  CAZAC Constant Amplitude Zero Auto Correction
  CCA Clear Channel Assessment
  CCE Control Channel Element
  CP Cyclic Prefix
  CQI Channel Quality Information
  CSI Channel State Information
  CSS Common Search Space
  DCI Downlink Control Information
  DL Downlink
  eNB Evolved Node B
  EPDCCH Enhanced Physical Downlink Control Channel
  E-RAB E-UTRAN Radio Access Bearer
  ETSI European Telecommunications Standards Institute
  E-UTRAN Evolved Universal Terrestrial Radio Access Network
  FBE Frame Based Equipment
  FDD Frequency Division Duplex
  FDMA Frequency Division Multiple Access
  FEC Forward Error Correction
  GPRS General Packet Radio Service
  GTP GPRS Tunneling Protocol
  HARQ Hybrid Automatic Repeat Request
  H-PLMN Home Public Land Mobile Network
  IP Internet Protocol
  ISRP Inter-System Routing Policy
  LAA Licensed Assisted Access
  LBE Load Based Equipment
  LBT Listen-Before-Talk
  LTE Long Term Evolution
  MCL Minimum Coupling Loss
  MCS Modulation and Coding Scheme
  MME Mobility Management Entity
  MU-MIMO Multi-User, Multiple-Input, Multiple-Output
  NACK or NAK Negative-Acknowledgment
  NAS Non-Access Stratum
  NBIFOM Network-Based IP Flow Mobility
  OFDM Orthogonal Frequency Division Multiplexing
  PCell Primary Cell
  PBCH Physical Broadcast Channel
  PCO Protocol Configuration Options
  PCRF Policy and Charging Rules Function
  PDCCH Physical Downlink Control Channel
  PDCP Packet Data Convergence Protocol
  PDN Packet Data Network
  PDSCH Physical Downlink Shared Channel
  PDU Protocol Data Unit
  PGW Packet Data Network Gateway
  PHICH Physical Hybrid ARQ Indicator Channel
  PLMN Public Land Mobile Network
  PRACH Physical Random Access Channel
  PRB Physical Resource Block
  PUCCH Physical Uplink Control Channel
  PUSCH Physical Uplink Shared Channel
  QoS Quality of Service
  QPSK Quadrature Phase Shift Keying
  RAB Radio Access Bearer
  RAN Radio Access Network
  RAR Random Access Response
  RRC Radio Resource Control
  RX Receive
  SC-FDMA Single Carrier Frequency Division Multiple Access
  SCell Secondary Cell
  SCH Shared Channel
  SGW Serving Gateway
  SIB System Information Block
  SINR Signal-to-Interference-Plus-Noise Ratio
  SR Scheduling Request
  TAU Tracking Area Update
  TBS Transport Block Size
  TCP Transmission Control Protocol
  TDD Time-Division Duplex
  TDM Time Division Multiplex
  TED Tunnel Endpoint Identification ("ID")
  TX Transmit
  UCI Uplink Control Information
  UE User Entity/Equipment (Mobile Terminal)
  UL Uplink
  UMTS Universal Mobile Telecommunications System
  V-PLMN Visited Public Land Mobile Network
  WiMAX Worldwide Interoperability for Microwave Access
  WLAN Wireless Local Area Network In wireless communications networks, various solutions to support interworking with WLAN access networks may be implemented. For example, some solutions may be based on high-level methods that do not use any radio-level interworking. One characteristic of these solutions is that the LTE and WLAN radio elements and procedures are not impacted. As another example, certain solutions may be based on radio-level methods that use radio-level interworking between E-UTRAN and WLAN. In such solutions, an eNB may receive WLAN measurement reports from a UE and decide to hand over traffic from one access to the other, or to aggregate the radio resources on both accesses.

Radio-level solutions may include a solution specified by 3GPP called "LTE-WLAN Radio Level Integration and Interworking Enhancements" [hereinafter "LWA"] and another solution specified by 3GPP called "LTE-WLAN RAN Level Integration Supporting Legacy WLAN" [hereinafter "interworking with IP tunneling"].

In an LWA solution, there is a new interface "Xw" between an eNB and a WLAN termination. As may be appreciated, a WLAN termination may be any WLAN element in a WLAN network, such as an AP, that terminates the Xw interface. The Xw interface may be used for preparing resources in the WLAN before handing over data traffic from LTE. In certain configurations, the eNB receives DL IP packets from an SGW in a core network, encapsulates these packets into PDCP PDUs, then forwards the PDCP PDUs to a UE either over E-UTRAN access, or over WLAN access (via Xw). In other configurations, the eNB may use both E-UTRAN access and WLAN access to forward PDCP PDUs to the UE, in which case the eNB aggregates the radio resources on both accesses.

Radio-level solutions for LTE-WLAN interworking and high-level solutions for LTE-WLAN interworking may not be coordinated. Accordingly, the radio-level solutions and high-level solutions may be applied independently and simultaneously, resulting in traffic routing conflicts. For example, a high-level solution may steer some traffic to LTE access but an underlying radio-level solution may steer the same traffic to WLAN access.

In one traffic conflict steering scenario, a PGW applies a high-level traffic steering solution that steers some IP flows to LTE access and some other IP flows to WLAN access. The steering applied by the PGW may be based on a NBIFOM solution wherein a steering policy (i.e., a set of routing rules) is configured in the PGW. If at the same time, an eNB applies a radio-level traffic steering solution, the eNB may steer some traffic to WLAN access even though such traffic was meant to be sent on LTE access according to PGW's steering policy. Such steering conflicts may be more severe in roaming scenarios in which the PGW resides in a H-PLMN and the eNB resides in a V-PLMN. In such cases, the steering policy of the H-PLMN (enforced by the PGW) should not be overridden by the steering policy of the V-PLMN (enforced by the eNB).

In another traffic conflict steering scenario, a UE applies autonomously (e.g., without any network involvement) traffic steering between LTE access and WLAN access by using ANDSF traffic steering rules that have been either provisioned over the air or have been configured in the UE via other means (e.g., during manufacturing). The UE, based on the active ANDSF traffic steering rules has decided to route an IP flow (e.g., a TCP connection towards a cloud server) via LTE access. Therefore, the UE establishes the TCP connection over the LTE interface and sends UL packets on the LTE interface. The UE also expects to receive DL packets for this TCP connection over the LTE interface. If, however, an eNB applies a radio-level traffic steering solution, some DL packets may be redirected by the eNB to WLAN access. This redirection of traffic to WLAN essentially overrides the traffic steering policy in the UE and should be avoided.

BRIEF SUMMARY

Apparatuses for offload bearing are disclosed. Methods and systems also perform the functions of the apparatus. In one embodiment, the apparatus includes a processor that determines whether the apparatus will apply traffic steering rules for routing data traffic on a first route across a first access network and a second route across a second access network. In some embodiments, the first and second routes may be different. In various embodiments, the apparatus includes a transmitter that transmits information that indicates whether the apparatus will apply the traffic steering rules.

In one embodiment, the first route includes a long term evolution ("LTE") network route. In a further embodiment, the second route includes a wireless local area network ("WLAN") route. In certain embodiments, the apparatus includes a receiver that receives the traffic steering rules from an external device. In various embodiments, the external device includes one or more of an access network discovery and selection function ("ANDSF") and a policy and charging rules function ("PCRF").

In some embodiments, the apparatus includes a storage device. In such embodiments, the processor may access the traffic steering rules via the storage device. In various embodiments, the transmitter transmits a first indication if the apparatus will apply the traffic steering rules and transmits a second indication if the apparatus will not apply the traffic steering rules. In one embodiment, the processor determines to apply traffic steering rules when the processor determines that the apparatus has a valid routing policy. In certain embodiments, the apparatus includes one or more of a packet data network gateway ("PGW") and a user equipment ("UE"). In various embodiments, the apparatus includes a PGW and the transmitter transmits the information when the processor determines to apply traffic steering rules according to a network-based internet protocol ("IP") flow mobility ("NBIFOM") solution. In certain embodiments, the apparatus includes a UE and the transmitter transmits the information when the processor determines that the UE has valid ANDSF traffic steering rules.

A method for offload bearing, in one embodiment, includes determining whether an apparatus will apply traffic steering rules for routing data traffic on a first route across a first access network and a second route across a second access network. In such an embodiment, the first and second routes may be different. In various embodiments, the method may include transmitting information from the apparatus that indicates whether the apparatus will apply the traffic steering rules.

In certain embodiments, the first route includes a long term evolution ("LTE") network route. In various embodiments, the second route includes a wireless local area network ("WLAN") route. In some embodiments, the method includes receiving the traffic steering rules from an external device. In various embodiments, the external device includes one or more of an access network discovery and selection function ("ANDSF") and a policy and charging rules function ("PCRF"). In one embodiment, the method includes accessing the traffic steering rules via a storage device of the apparatus.

In some embodiments, transmitting the information from the apparatus that indicates whether the apparatus will apply the traffic steering rules includes transmitting a first indication if the apparatus will apply the traffic steering rules and transmitting a second indication if the apparatus will not apply the traffic steering rules. In one embodiment, the method includes determining to apply traffic steering rules when the apparatus has a valid routing policy.

In one embodiment, transmitting the information from the apparatus includes transmitting the information from a packet data network gateway ("PGW") to a mobility management entity ("MME"). In certain embodiments, the information from the PGW to the MME indicates whether the PGW will apply traffic steering rules according to a network-based internet protocol ("IP") flow mobility ("NBIFOM") solution. In various embodiments, the method includes transmitting an offload indication from the MME to a base unit. In such embodiments, the offload indication may be based on the information transmitted from the PGW to the MME and may indicate whether the base unit can offload a predetermined data traffic type to a secondary radio access. In certain embodiments, the predetermined data traffic type is data traffic associated with a radio access bearer ("RAB") and the secondary radio access is a wireless local area network ("WLAN") access. In one embodiment, the base unit determines whether to apply radio-level traffic steering for the predetermined data traffic type based on the offload indication.

In various embodiments, transmitting the information from the apparatus includes transmitting a non-access stratum ("NAS") message from a user equipment ("UE") to a mobility management entity ("MME"). In one embodiment, the method includes transmitting the information when the apparatus has valid ANDSF traffic steering rules. In such an embodiment, the apparatus includes a UE.

In one embodiment, an apparatus includes a receiver that receives first information that indicates whether a first apparatus will apply traffic steering rules for routing data traffic on a first route across a first access network and a second route across a second access network. In such an embodiment, the first and second routes may be different. In various embodiments, the apparatus may include a storage device that stores a representation of the first information. The apparatus may also include a transmitter that transmits second information that indicates whether offloading a predetermined data traffic type is permitted by a second apparatus. The second information may be determined based on the representation of the first information.

In certain embodiments, the apparatus includes a mobility management entity ("MME"). In various embodiments, the first apparatus includes one or more of a packet data network gateway ("PGW") and a user equipment ("UE"). In one embodiment, the second apparatus includes a base unit. In some embodiments, if offloading the predetermined data traffic type is permitted by the second apparatus, the second apparatus may selectively apply radio-level steering for the predetermined data traffic type. In certain embodiments, if offloading the predetermined data traffic type is permitted by the second apparatus, the second apparatus may selectively offload at least part of the predetermined data traffic type to an alternative radio access. In one embodiment, the predetermined data traffic type is data traffic associated with a radio access bearer ("RAB").

Another method for offload bearing includes receiving first information that indicates whether a first apparatus will apply traffic steering rules for routing data traffic on a first route across a first access network and a second route across a second access network. In such an embodiment, the first and second routes may be different. In various embodiments, the method includes storing a representation of the first information. In some embodiments, the method includes transmitting second information that indicates whether offloading a predetermined data traffic type is permitted by a second apparatus. In such embodiments, the second information may be determined based on the representation of the first information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
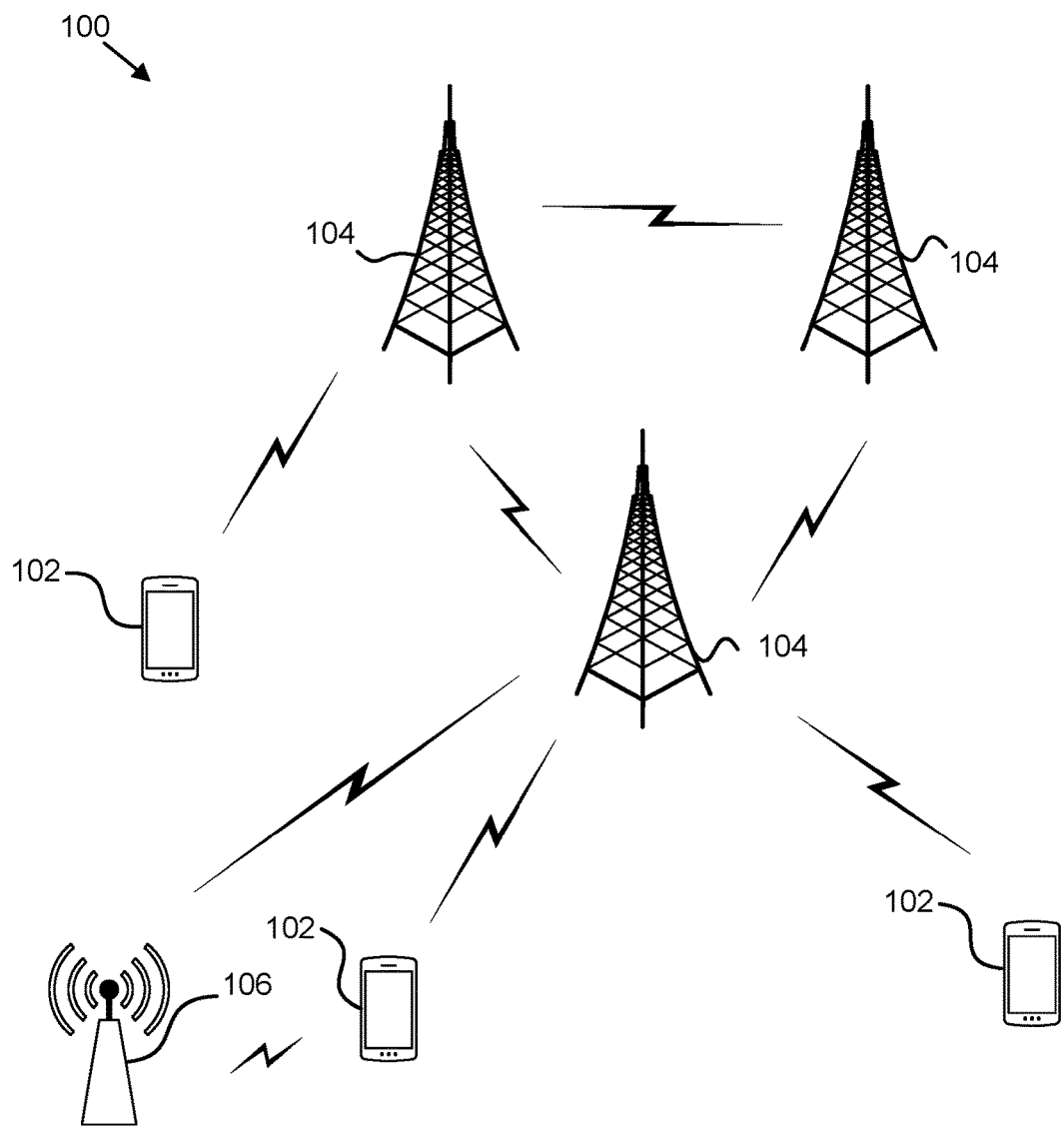
FIG. 1 is a schematic block diagram illustrating one embodiment of a wireless communication system for offload bearing.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for offload bearing. In one embodiment, the wireless communication system 100 includes remote units 102, base units 104, and unlicensed carriers 106. Even though a specific number of remote units 102, base units 104, and unlicensed carriers 106 are depicted in FIG. 1, one of skill in the art will recognize that any number of remote units 102, base units 104, and unlicensed carriers 106 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals. Furthermore, the remote units 102 may communicate directly with one or more unlicensed carriers 106.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that may include one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. For example, one or more base units 104 may be communicably coupled to an MME, an SGW, and/or a PGW.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain. The unlicensed carriers 106 may be any suitable unlicensed carrier, such as a Wi-Fi access point ("AP"). The unlicensed carriers 106 may communicate with one or more of the remote units 102 and/or one or more of the base units 104. Moreover the unlicensed carriers 106 may facilitate WLAN access and/or may be part of a WLAN route.

In one embodiment, an apparatus (e.g., PGW, UE, remote unit 102) may determine whether to apply traffic steering rules for routing data traffic on a first route across a first access network (e.g., LTE network route) and a second route across a second access network (e.g., WLAN route). In such an embodiment, the first and second routes may be different. The apparatus may transmit information from the apparatus that indicates whether the apparatus will apply the traffic steering rules. Accordingly, by transmitting whether the apparatus will apply traffic steering rules, another device, such as an MME may use the transmitted data to inform other devices regarding whether offloading is permitted.

Figure 2:
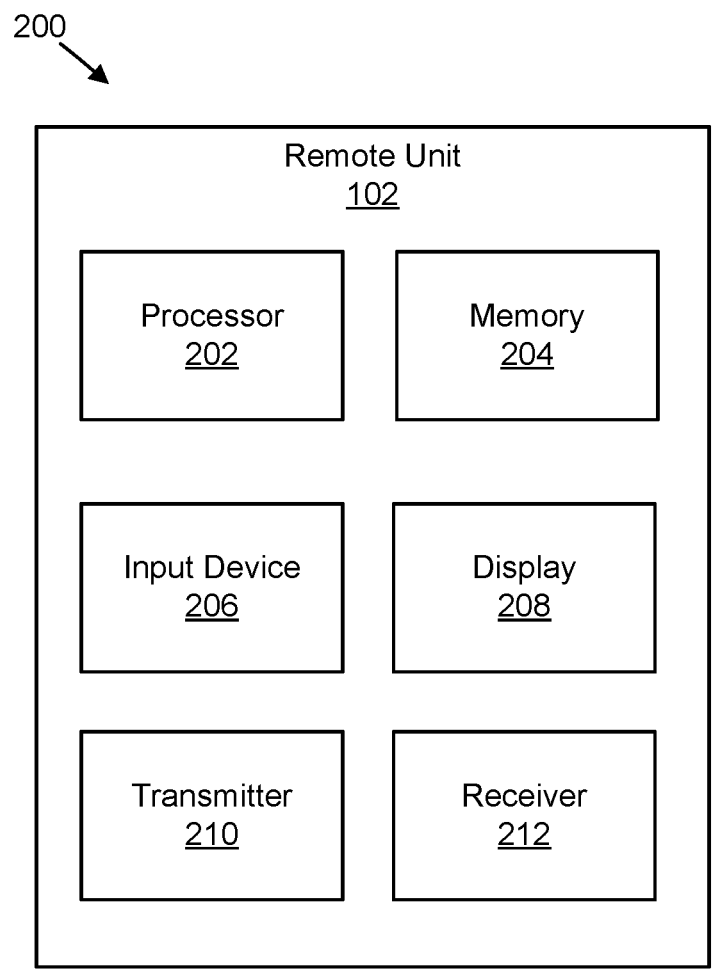
FIG. 2 is a schematic block diagram illustrating one embodiment of an apparatus that may be used for offload bearing.

FIG. 2 depicts one embodiment of an apparatus 200 that may be used for offload bearing. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine whether the remote unit 102 will apply traffic steering rules for routing data traffic on a first route across a first access network and a second route across a second access network.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit feedback information and/or an indication to the base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
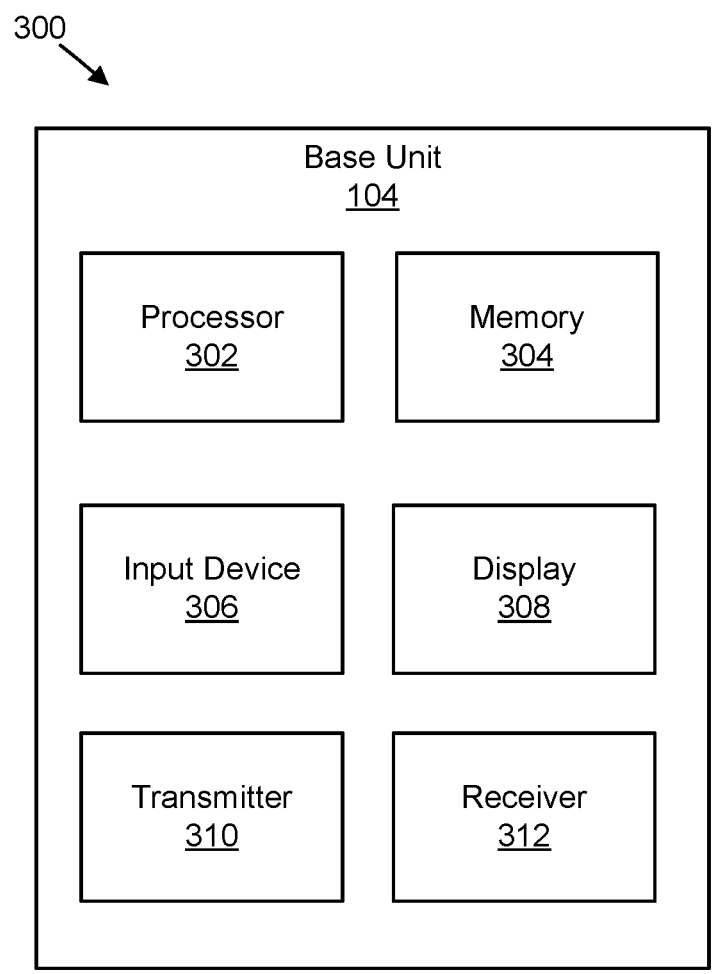
FIG. 3 is a schematic block diagram illustrating another embodiment of an apparatus that may be used for offload bearing.

FIG. 3 depicts another embodiment of an apparatus 300 that may be used for offload bearing. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively. In certain embodiments, the processor 302 may be used to determine whether the base unit 104 will apply traffic steering rules for routing data traffic on a first route across a first access network and a second route across a second access network.

The transmitter 310 is used to provide DL communication signals to the remote unit 102 and the receiver 312 is used to receive UL communication signals from the remote unit 102. In certain embodiments, the transmitter 310 is used to transmit information that indicates whether the apparatus will apply traffic steering rules. As may be appreciated, in certain embodiments, an MME, an SGW, and/or a PGW may include one or more components found in the base unit 104. Furthermore, in certain embodiments, the base unit 104 may represent one embodiment of an MME, an SWG or a PGW.

Figure 4:
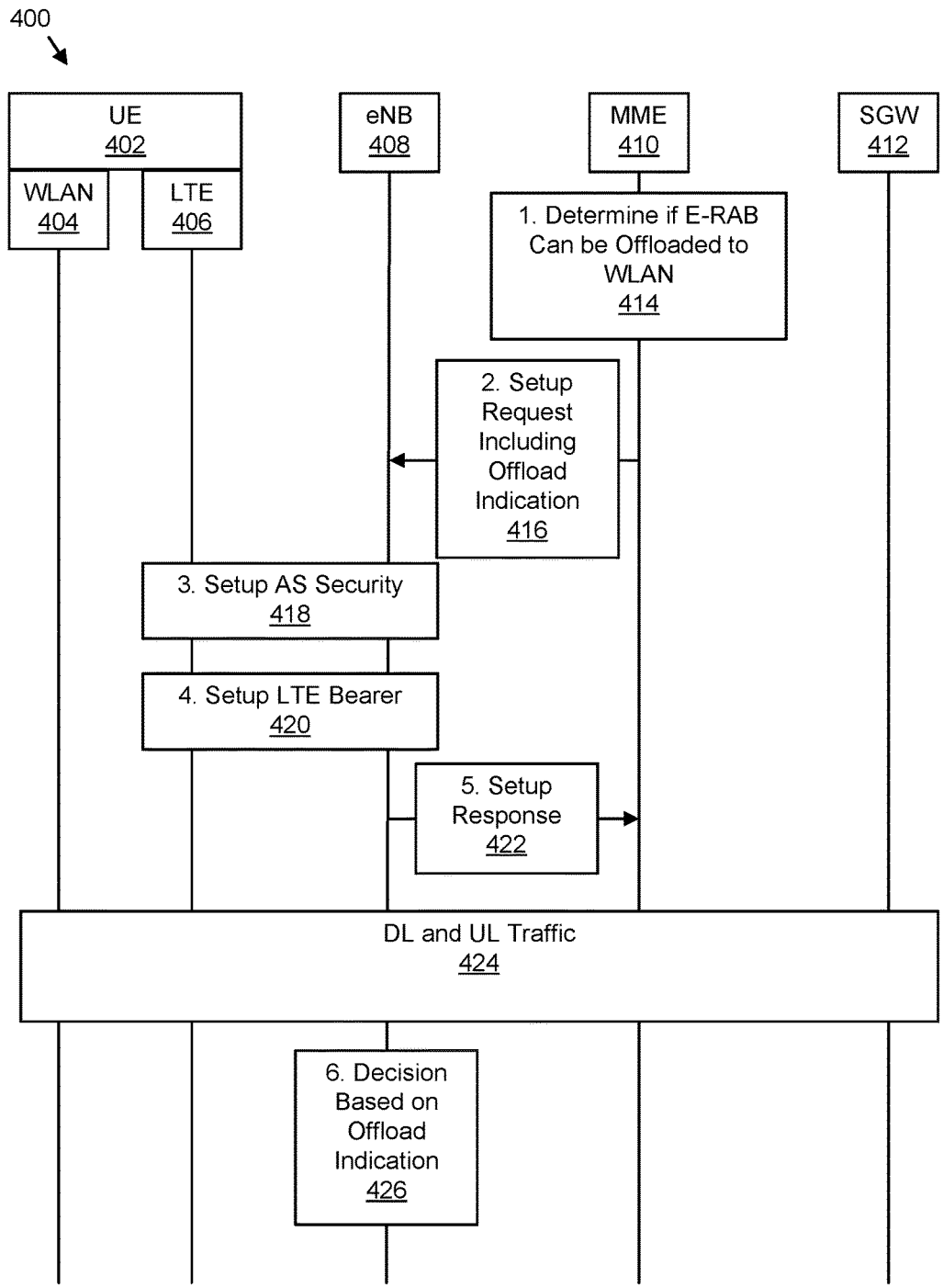
FIG. 4 illustrates one embodiment of communication used for offload bearing.

FIG. 4 illustrates one embodiment of communication 400 used for offload bearing. In the illustrated embodiment, communication with a UE 402 via a WLAN 404 route and an LTE 406 route are illustrated. In certain embodiments, the UE 402 may be one embodiment of the remote unit 102. Moreover, communication with an eNB 408, an MME 410, and an SWG 412 are illustrated. In some embodiments, the eNB 408 may be one embodiment of the base unit 104. Furthermore, the MME 410 and the SWG 412 may include features similar to those found in the base unit 104 (e.g., the MME 410 and/or the SWG 412 may include a processor 302, a memory 304, an input device 306, a display 308, a transmitter 310, and/or a receiver 312).

As illustrated, the MME 410 may determine 414 if an E-RAB can be offloaded to WLAN. Determining 414 if an E-RAB can be offloaded to WLAN may be performed prior to the MME 410 requesting that the eNB 408 establish a new E-RAB. The MME 410 may transmit a setup request 416 including an offload indication to the eNB 408. The setup request 416 may be transmitted from the MME 410 to the eNB 408 when a new E-RAB is established, such as inside an initial context setup request or an E-RAB setup request. In certain embodiments, the MME 410 may transmit the setup request 416 on an S1-c interface. Moreover, the offload indication may be called an "Offload permitted" parameter. The setup request 416 may include one or more of the following: an E-RAB ID, E-RAB level QoS parameters, GTP UL TED, UL transport address, offload permitted identifier, UE security capabilities, security key, handover restriction list, NAS PDU, and so forth.

The eNB 408 and the UE 402 setup 418 Access Stratum ("AS") security, then the eNB 408 instructs the UE 402 to setup 420 an LTE radio bearer (e.g., by using an RRC Connection Reconfiguration message). The eNB 408 sends a setup response 422 to the MME 410. The setup response 422 may be transmitted from the eNB 408 to the MME 410 inside an initial context setup response or an E-RAB setup response. The setup response 422 may include one or more of the following: an E-RAB ID, GTP DL TED, DL transport address, and so forth.

DL traffic 424 may then be transmitted from the SGW 412 to the UE 402 using the established E-RAB. Similarly, UL traffic 424 may then be transmitted from the UE 402 to the SGW 412 using the established E-RAB. The eNB 408 makes decisions 426 based on the offload indication received from the MME 410. For example, if the E-RAB is indicated as offloadable (e.g., "Offload permitted"=TRUE), then the eNB 408 may apply a LTE-WLAN interworking solution (e.g., radio-level traffic steering) to steer all or some E-RAB traffic to WLAN access. If, however, the E-RAB is indicated as non-offloadable (e.g., "Offload permitted"=FALSE), the eNB 408 may not apply the LTE-WLAN interworking solution for this E-RAB, so all E-RAB traffic is sent on LTE access. Accordingly, in some embodiments, the MME 410 may control whether a radio-level traffic steering solution is applied for a certain E-RAB and may disable such a solution if a high-level traffic steering solution is applied for a certain E-RAB.

Figure 5:
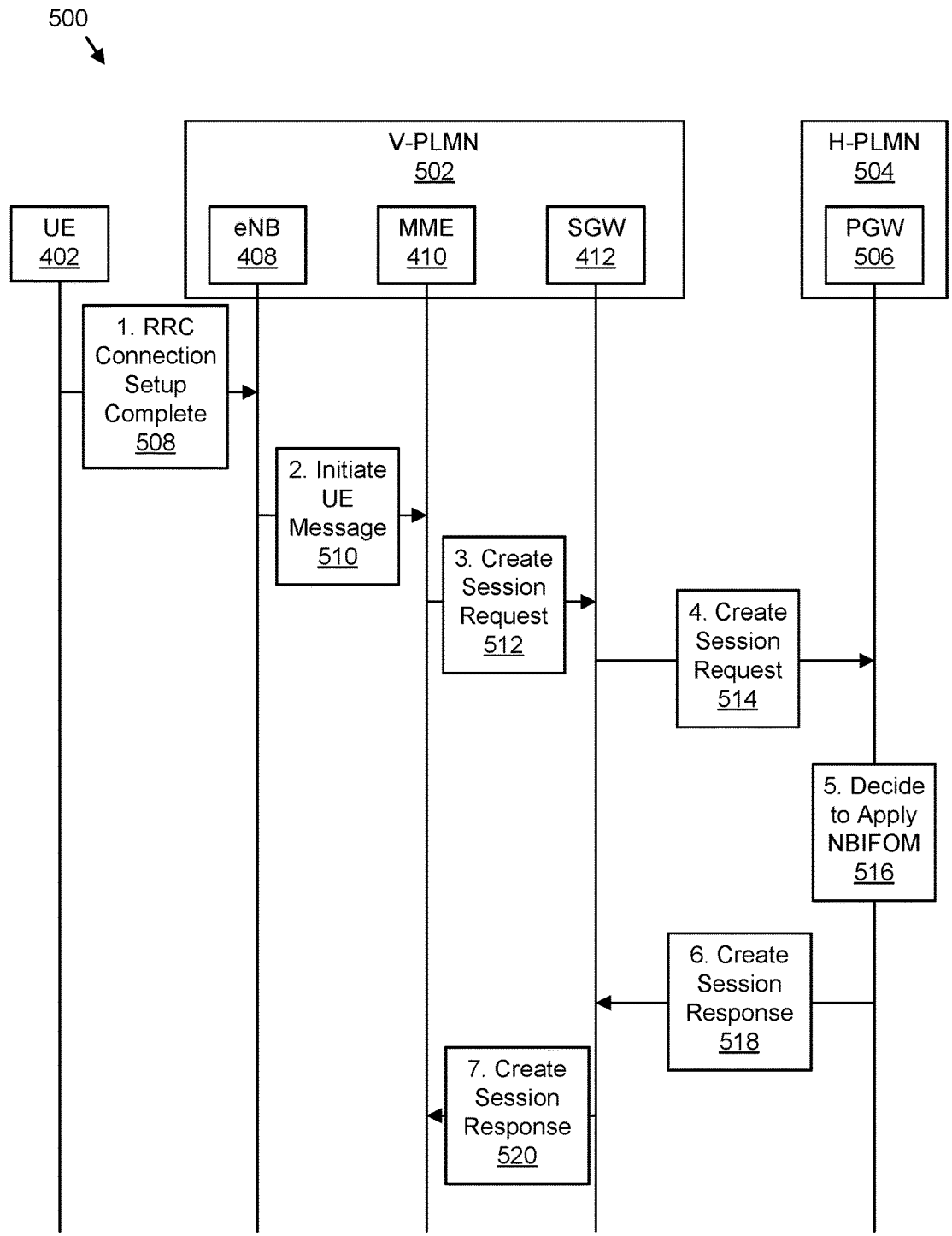
FIG. 5 illustrates another embodiment of communication used for offload bearing.

FIG. 5 illustrates another embodiment of communication 500 used for offload bearing. In the illustrated embodiment, communication with a UE 402 is illustrated. In certain embodiments, the UE 402 may be one embodiment of the remote unit 102. Moreover, communication with an eNB 408, an MME 410, and an SWG 412 are illustrated. In some embodiments, the eNB 408 may be one embodiment of the base unit 104. Furthermore, the MME 410 and the SWG 412 may include features similar to those found in the base unit 104 (e.g., the MME 410 and/or the SWG 412 may include a processor 302, a memory 304, an input device 306, a display 308, a transmitter 310, and/or a receiver 312). In the embodiment illustrated in FIG. 5, the UE 402 is roaming into a Visited PLMN ("V-PLMN") 502 and establishes a PDN connection with a PGW 506 located in a Home PLMN ("H-PLMN") 504. The V-PLMN 502 includes the eNB 408, the MME 410, and the SGW 412. In addition, the H-PLMN 504 includes the PGW 506. Communication with the PGW 506 is also illustrated. The PGW 506 may include features similar to those found in the base unit 104. As may be appreciated, the following messages may be transmitted and/or received as part of determining 414 if an E-RAB can be offloaded to WLAN of FIG. 4.

As illustrated, the UE 402 sends a message 508 to the eNB 408 indicating that RRC connection setup is complete. The message 508 contains a Non-Access Stratum ("NAS") message, which is a PDN connectivity request message indicating that the UE 402 wants to establish a new PDN connection. Moreover, the eNB 408 sends an Initial UE message 510 to the MME 410, which includes also the PDN connectivity request message. The PDN connectivity request message contains parameters such as a requested APN an NBIFOM request indication, an NBIFOM mode, and so forth. Furthermore, the MME 410 sends a message 512 to the SGW 412 to create a new GTP session for the requested PDN connection. The message 512 to create the new GTP session includes also the NBIFOM request indication, the NBIFOM mode, and so forth. In addition, the SGW 412 may send a message 514 to the PGW 506 to create another GTP session. The message 514 includes also the NBIFOM request indication, the NBIFOM mode, and so forth. The NBIFOM request indication is included in the PDN connectivity request message by the UE 402 when the UE 402 wants the PGW 506 to apply NBIFOM, i.e. a high-level traffic steering solution. The NBIFOM mode indicates if the UE 402 want the NBIFOM to operate in "UE-initiated" mode or in "Network-initiated" mode, as specified in 3GPP TS 23.161.

The PGW 506 decides 516 whether it will apply the NBIFOM procedures (e.g., traffic steering between LTE and WLAN) for the requested PDN connection. Then, the PGW 506 sends a session response message 518 to the SGW 412 to indicate that the requested GTP session between the PGW 506 and the SGW 412 was accepted. The message 518 may include a NBIFOM accept indication, which will be communicated to UE 402 (via the SGW 412, the MME 410 and the eNB 408) and indicates if the PGW 506 accepted the NBIFOM request for the PDN connection. Moreover, the message 518 may include an "NBIFOM applied indication" that indicates whether or not the PGW 506 will apply NBIFOM for the PDN connection, i.e. whether it will apply a high-level solution for steering the traffic of the PDN connection to either LTE access or to WLAN access. Furthermore, the SWG 412 sends a message 520 to the MME 410 to indicate that the requested GTP session between the SGW 412 and the eNB 408 was accepted. The message 520 may include the NBIFOM accept indication, which will be communicated to UE 402. Moreover, the message 520 may include the "NBIFOM applied indication" that was communicated from the PGW 506 to the SGW 412 within the message 518. When the MME 410 receives the NBIFOM applied indication, the MME 410 determines that a high-level traffic steering solution will be applied for the traffic of the PDN connection if the NBIFOM applied indication is TRUE. If the NBIFOM applied indication is TRUE, all E-RABs associated with this PDN connection will be requested with an offloading indication "Offload permitted=FALSE." When an eNB 408 receives the indication "Offload permitted=FALSE," it does not apply a radio-level traffic steering solution for the considered E-RAB. In contrast, if the NBIFOM applied indication is FALSE, all E-RABs associated with this PDN connection will be requested with an offloading indication "Offload permitted=TRUE." When an eNB 408 receives the indication "Offload permitted=TRUE," it selectively applies radio-level traffic steering for the considered E-RAB.

Figure 6:
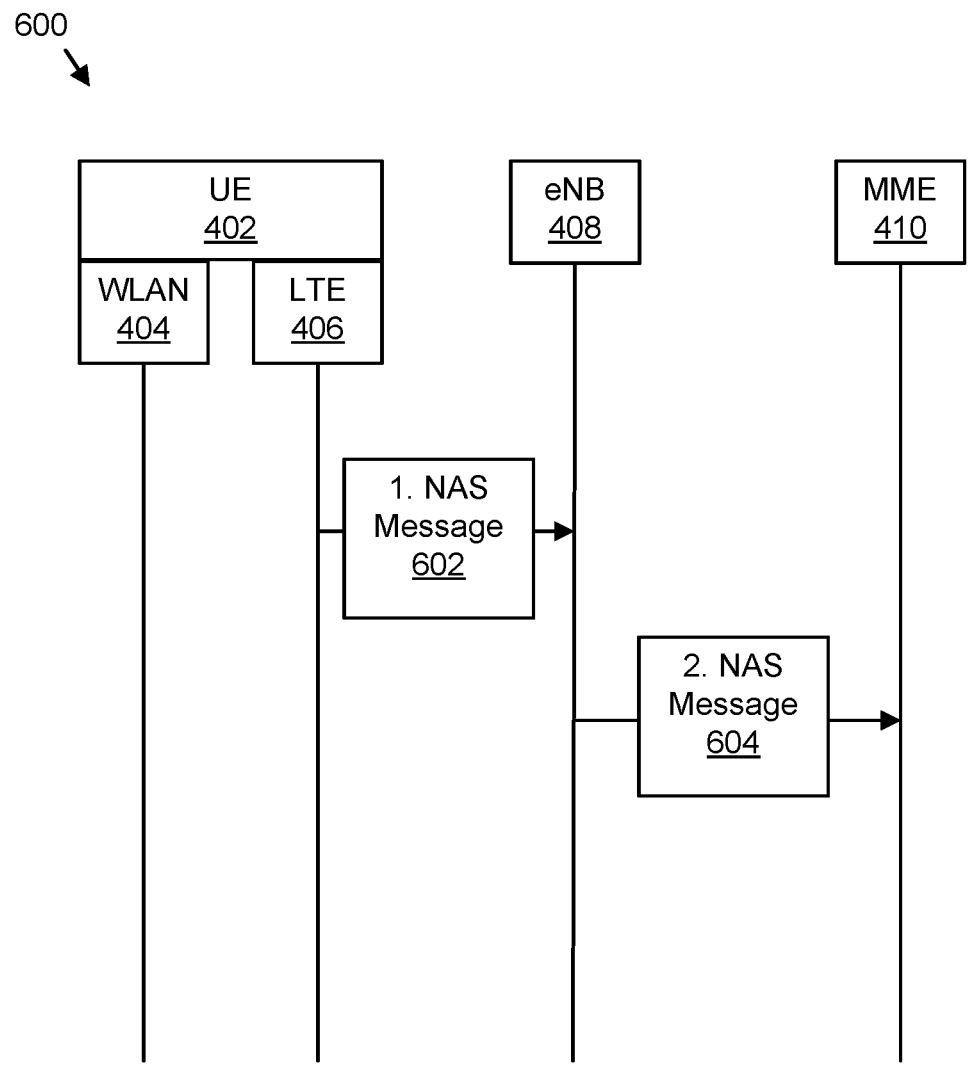
FIG. 6 illustrates a further embodiment of communication used for offload bearing.

FIG. 6 illustrates a further embodiment of communication 600 used for offload bearing. In the illustrated embodiment, communication with a UE 402 via a WLAN 404 route and an LTE 406 route are illustrated. In certain embodiments, the UE 402 may be one embodiment of the remote unit 102. Moreover, communication with an eNB 408 and an MME 410 are illustrated. In some embodiments, the eNB 408 may be one embodiment of the base unit 104. Furthermore, the MME 410 may include features similar to those found in the base unit 104 (e.g., the MME 410 may include a processor 302, a memory 304, an input device 306, a display 308, a transmitter 310, and/or a receiver 312). As may be appreciated, the following messages may be transmitted and/or received as part of determining 414 if an E-RAB can be offloaded to WLAN of FIG. 4.

As illustrated, the UE 402 sends an NAS message 602 to the eNB 408. Moreover, the eNB 408 sends an NAS message 604 to the MME 410. The NAS messages 602 and 604 include substantially the same information. In one embodiment, the NAS messages 602 and 604 may include an attach request, a TAU request, a PDN connectivity request, and/or a service request. Moreover, the NAS messages 602 and 604 may include a traffic steering indication that indicates how the UE 402 intends to handle traffic steering. For example, an indication of "Traffic Steering=TRUE" may indicate that the UE 402 wants to apply its own high-level traffic steering solution (e.g., rules) for routing traffic between WLAN access and LTE access. In contrast, an indication of "Traffic Steering=FALSE" may indicate that the UE 402 does not want to apply its own high-level traffic steering solution for routing traffic between WLAN access and LTE access. As may be appreciated, the UE 402 may autonomously apply traffic steering when the UE 402 supports applicable ANDSF procedures and has valid traffic steering policies. The UE 402 may receive traffic steering policies over the air from the network (e.g., from an ANDSF server), or the traffic steering policies may be configured in the UE 402 in some other way. The ANDSF traffic steering policies are composed of one or more traffic steering rules, such as Inter-System Routing Policy ("ISRP") rules and Inter-APN Routing Policy ("IARP") rules.

In one embodiment, the UE 402 sets the "Traffic Steering" indication as follows: when the UE 402 has an ISRP rule that is valid in the registered PLMN, the UE 402 sets the "Traffic Steering" indication to TRUE; and otherwise the UE 402 sets the "Traffic Steering" indication to FALSE. In certain embodiments, the "Traffic Steering" indication is stored in the MME 410 and is used by the MME 410 to determine when an E-RAB for the UE 402 should be offloadable or non-offloadable. Specifically, when the stored "Traffic Steering" indication is TRUE, the MME 410 may establish E-RABs for the UE 402 by setting the "Offload permitted" indication to FALSE. In contrast, when the stored "Traffic Steering" indication is FALSE, the MME 410 may establish E-RABs for the UE 402 by setting the "Offload permitted" indication to either TRUE or FALSE.

Figure 7:
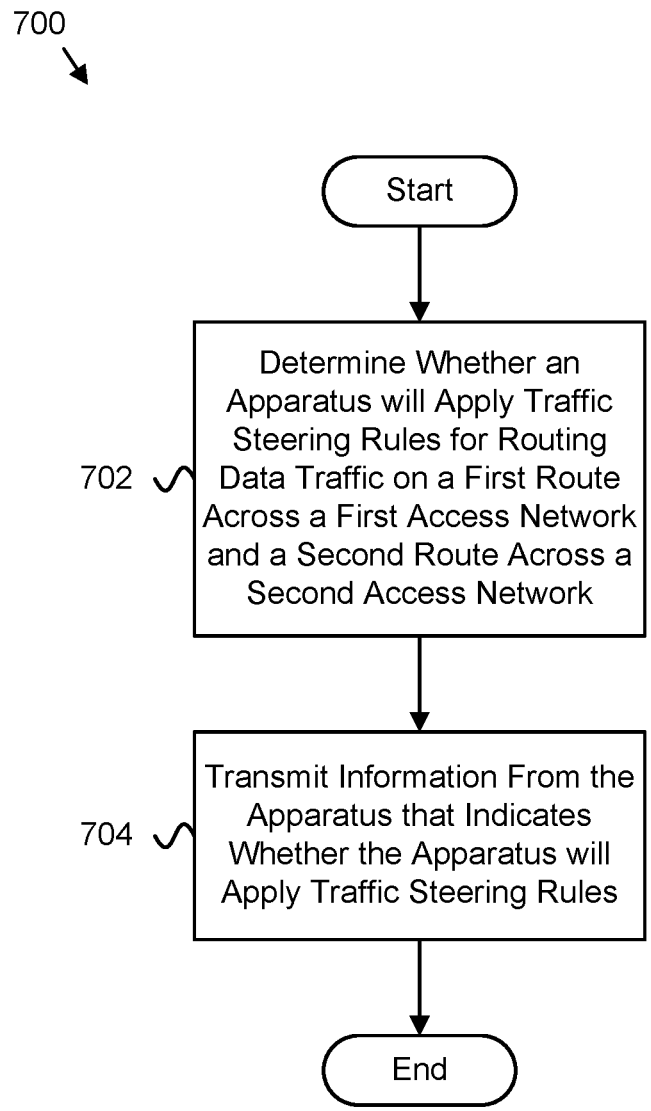
FIG. 7 is a schematic flow chart diagram illustrating one embodiment of a method for offload bearing.

FIG. 7 is a schematic flow chart diagram illustrating one embodiment of a method 700 for offload bearing. In some embodiments, the method 700 is performed by an apparatus, such as the remote unit 102, UE, or a PGW. In certain embodiments, the method 700 may be performed by a processor executing program code, for example, a microcontroller, a microprocessor, a CPU, a GPU, an auxiliary processing unit, a FPGA, or the like.

The method 700 may include determining 702 whether an apparatus will apply traffic steering rules for routing data traffic on a first route across a first access network and a second route across a second access network. In one embodiment, the first route across the first access network includes an LTE network route across an LTE access network. In some embodiments, the second route across the second access network includes a WLAN route across a WLAN access network. In certain embodiments, the first and second routes may be different. The method 700 may include transmitting 704 information from the apparatus that indicates whether the apparatus will apply the traffic steering rules, and the method 700 may end. In some embodiments, transmitting 704 the information from the apparatus that indicates whether the apparatus will apply the traffic steering rules includes transmitting a first indication if the apparatus will apply the traffic steering rules (e.g., "Traffic Steering=TRUE," "NBIFOM Applied Indication=TRUE") and transmitting a second indication if the apparatus will not apply the traffic steering rules (e.g., "Traffic Steering=FALSE," "NBIFOM Applied Indication=FALSE").

In certain embodiments, transmitting the information from the apparatus includes transmitting the information from a PGW to an MME. Moreover, the information from the PGW to the MME may indicate whether the PGW will apply traffic steering rules according to a NBIFOM solution.

In various embodiments, the method 700 may include transmitting an offload indication from the MME to a base unit (e.g., base unit 104, eNB). In such embodiments, the offload indication is based on the information transmitted from the PGW to the MME and indicates whether the base unit can offload a predetermined data traffic type to a secondary radio access. Furthermore, the predetermined data traffic type may be data traffic associated with a RAB and the secondary radio access is WLAN access. In one embodiment, the base unit determines whether to apply radio-level traffic steering for the predetermined data traffic type based on the offload indication. In some embodiments, transmitting the information from the apparatus includes transmitting a NAS message from a UE (e.g., remote unit 102) to an MME.

In one embodiment, the method 700 includes receiving the traffic steering rules from an external device. In certain embodiments, the external device may include an ANDSF server. In some embodiments, the external device may include a PCRF. In various embodiments, the method 700 includes accessing the traffic steering rules via a storage device (e.g., memory 304) of the apparatus. In some embodiments, the method 700 includes determining to apply traffic steering rules when the apparatus has a valid routing policy. In certain embodiments, the method 700 includes transmitting the information when the apparatus has valid ANDSF traffic steering rules. In such embodiments, the apparatus may be a UE.

Figure 8:
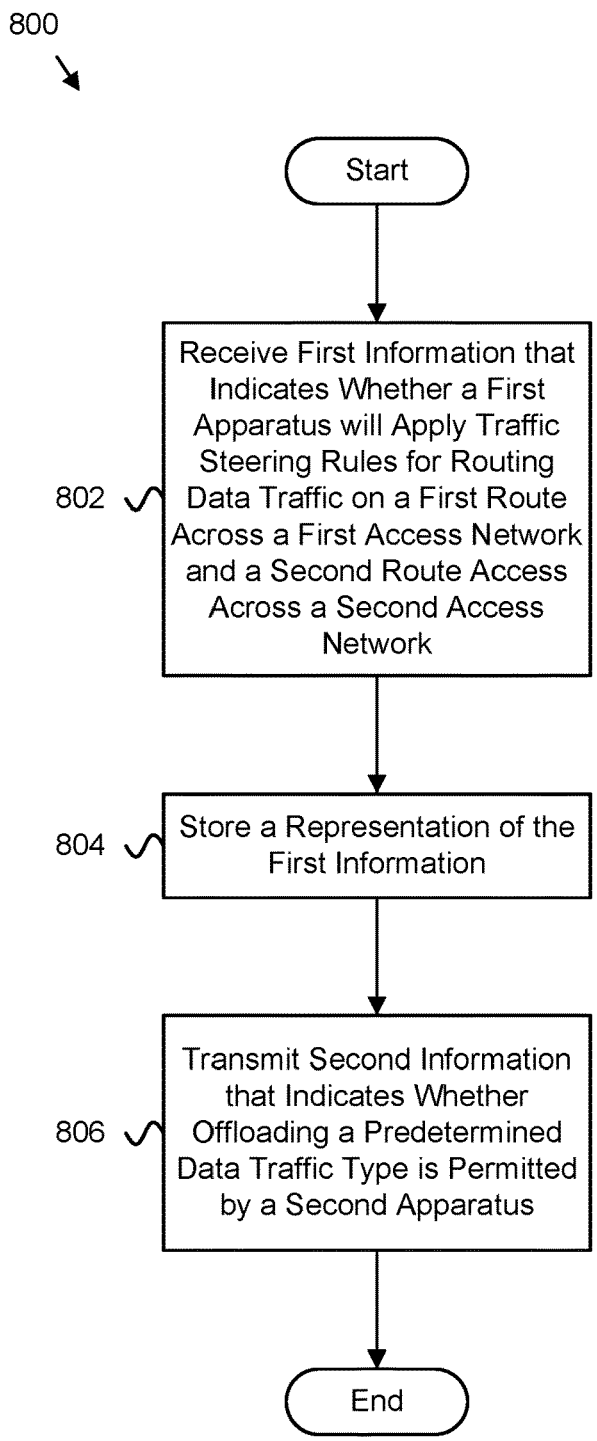
FIG. 8 is a schematic flow chart diagram illustrating another embodiment of a method for offload bearing.

FIG. 8 is a schematic flow chart diagram illustrating another embodiment of a method 800 for offload bearing. In some embodiments, the method 800 is performed by an apparatus, such as an MME. In certain embodiments, the method 800 may be performed by a processor executing program code, for example, a microcontroller, a microprocessor, a CPU, a GPU, an auxiliary processing unit, a FPGA, or the like.

The method 800 may include receiving 802 first information that indicates whether a first apparatus will apply traffic steering rules for routing data traffic on a first route across a first access network and a second route across a second access network (e.g., "Traffic Steering=TRUE," "Traffic Steering=FALSE," "NBIFOM Applied Indication=TRUE," "NBIFOM Applied Indication=FALSE"). In one embodiment, the first and second routes are different. In certain embodiments, the receiver 312 may receive 802 the first information. The method 800 may also include storing 804 a representation of the first information. In one embodiment, a storage device, such as the memory 304 may store the representation of the first information.

The method 800 may include transmitting 806 second information that indicates whether offloading a predetermined data traffic type is permitted by a second apparatus (e.g., "Offload permitted=TRUE," "Offload permitted=FALSE"). In certain embodiments, the second information may be determined based on the representation of the first information. Then the method 800 may end. In certain embodiments, the transmitter 310 may transmit 806 the second information.

In one embodiment, the first apparatus includes one or more of a PGW and a UE (e.g., remote unit 102). In some embodiments, the second apparatus includes a base unit (e.g., base unit 104). Moreover, in certain embodiments, if offloading the predetermined data traffic type is permitted by the second apparatus, the second apparatus selectively applies radio-level steering for the predetermined data traffic type. In various embodiments, if offloading the predetermined data traffic type is permitted by the second apparatus, the second apparatus selectively offloads at least part of the predetermined data traffic type to an alternative radio access (e.g., WLAN, WiMAX, etc.). In one embodiment, the predetermined data traffic type is data traffic associated with a RAB.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope

What is claimed is:

1. An apparatus comprising:
a processor that determines whether the apparatus will apply traffic steering rules for routing data traffic on a first route across a first access network and a second route across a second access network, wherein the first and second routes are different and determining whether the apparatus will apply traffic steering rules for routing data traffic comprises:
determining whether the apparatus has a valid routing policy rule;
applying traffic steering rules if it is determined that the apparatus has a valid routing policy rule; and not applying traffic steering rules if it is determined that the apparatus does not have a valid routing policy rule; and a transmitter that transmits information that indicates whether the apparatus will apply the traffic steering rules, wherein the transmitter transmits a first indication if the apparatus will apply the traffic steering rules and transmits a second indication if the apparatus will not apply the traffic steering rules.

2. The apparatus of claim 1, wherein the first route comprises a long term evolution ("LTE") network route.

3. The apparatus of claim 1, wherein the second route comprises a wireless local area network ("WLAN") route.

4. The apparatus of claim 1, further comprising a receiver that receives the traffic steering rules from an external device.

5. The apparatus of claim 4, wherein the external device comprises one or more of an access network discovery and selection function ("ANDSF") and a policy and charging rules function ("PCRF").

6. The apparatus of claim 1, comprising a storage device, wherein the processor accesses the traffic steering rules via the storage device.

7. The apparatus of claim 1, wherein the apparatus comprises one or more of a packet data network gateway ("PGW") and a user equipment ("UE").

8. The apparatus of claim 1, wherein the apparatus comprises a PGW and the transmitter transmits the information when the processor determines to apply traffic steering rules according to a network-based internet protocol ("IP") flow mobility ("NBIFOM") solution.

9. The apparatus of claim 1, wherein the apparatus comprises a UE and the transmitter transmits the information when the processor determines that the UE has valid ANDSF traffic steering rules.

10. A method comprising:
  determining whether an apparatus will apply traffic steering rules for routing data traffic on a first route across a first access network and a second route across a second access network, wherein the first and second routes are different, and determining whether the apparatus will apply traffic steering rules for routing data traffic comprises:
    determining whether the apparatus has a valid routing policy rule;
    applying traffic steering rules if it is determined that the apparatus has a valid routing policy rule; and
    not applying traffic steering rules if it is determined that the apparatus does not have a valid routing policy rule; and
  transmitting information from the apparatus that indicates whether the apparatus will apply the traffic steering rules, wherein transmitting the information comprises transmitting a first indication if the apparatus will apply the traffic steering rules and transmitting a second indication if the apparatus will not apply the traffic steering rules.

11. The method of claim 10, wherein transmitting the information from the apparatus comprises transmitting the information from a packet data network gateway ("PGW") to a mobility management entity ("MME").

12. The method of claim 11, comprising transmitting an offload indication from the MME to a base unit, wherein the offload indication is based on the information transmitted from the PGW to the MME and indicates whether the base unit can offload a predetermined data traffic type to a secondary radio access.

13. The method of claim 12, wherein the predetermined data traffic type is data traffic associated with a radio access bearer ("RAB") and the secondary radio access is a wireless local area network ("WLAN") access.

14. The method of claim 13, wherein the base unit determines whether to apply radio-level traffic steering for the predetermined data traffic type based on the offload indication.

15. The method of claim 10, wherein transmitting the information from the apparatus comprises transmitting a non-access stratum ("NAS") message from a user equipment ("UE") to a mobility management entity ("MME").

16. An apparatus comprising:
  a receiver that receives first information that indicates whether a first apparatus will apply traffic steering rules for routing data traffic on a first route across a first access network and a second route across a second access network, wherein:
    the first and second routes are different;
    the first information comprises a first indication if the first apparatus will apply the traffic steering rules and a second indication if the first apparatus will not apply the traffic steering rules;
    the first indication is provided if the first apparatus determines that it has a valid routing policy rule; and
    the second indication is provided if the first apparatus determines that it does not have a valid routing policy rule;
  a storage device that stores a representation of the first information; and
  a transmitter that transmits second information that indicates whether offloading a predetermined data traffic type is permitted by a second apparatus, wherein the second information is determined based on the representation of the first information.

17. The apparatus of claim 16, wherein if offloading the predetermined data traffic type is permitted by the second apparatus, the second apparatus selectively applies radio-level steering for the predetermined data traffic type.

18. The apparatus of claim 16, wherein if offloading the predetermined data traffic type is permitted by the second apparatus, the second apparatus selectively offloads at least part of the predetermined data traffic type to an alternative radio access.

* * * * *